UNITED STATES PATENT OFFICE.

ALFRED H. COWLES, OF SEWAREN, NEW JERSEY, ASSIGNOR TO THE ELECTRIC SMELTING & ALUMINUM CO.

CHARGE MIXTURE FOR FORMING ALKALI-SILICO-ALUMINATE AND HYDROCHLORIC ACID.

1,040,893.

Specification of Letters Patent. Patented Oct. 8, 1912.

No Drawing. Application filed July 7, 1911. Serial No. 637,346.

*To all whom it may concern:*

Be it known that I, ALFRED H. COWLES, a citizen of the United States, and resident of Sewaren, in the county of Middlesex and State of New Jersey, have invented certain new and useful Improvements in Charge Mixtures for Forming Alkali-Silico-Aluminate and Hydrochloric Acid, of which the following is a specification.

My invention relates to a new and improved charge mixture for forming sodic-silico-aluminate and hydrochloric acid.

It relates particularly to a charge mixture adapted to be subjected to the process set forth in my co-pending Ser. No. 521,692, filed October 8th., 1909. This process comprises briefly the subjecting a charge mixture containing an alkali chlorid, clay and carbon to the action of steam and air and gases of combustion at high temperatures in a furnace, thereby producing alkali-silico-aluminate and hydrochloric acid.

The object of the invention is to produce a charge mixture of such a character as to bring about an increase in furnace capacity by enabling more frequent runs to be made, and also producing a higher grade and greater uniformity in the products. My invention has resulted in producing a practical commercial article and overcomes the defects inherent in former processes and products of this nature.

It has long been known that water vapor will decompose alkali chlorids in the presence of alumina, or silica or both combined at elevated temperatures. There is formed an alkali oxid that combines with the alumina, or silica, or both, as the case may be, the hydrogen of the water vapor uniting with the chlorin to form hydrochloric acid gas. Many attempts have been made to utilize the reactions above set forth, so as to produce a practical technical result. British Patent No. 2050, of 1862, to Gossage, and the British Patent No. 11,492, to Adolf Kayser show such an attempt, and in the United States Patent No. 376,409, of January 10, 1888, to Kayser there is set forth a method of decomposing salt with clay and steam in a furnace of the down draft kind; but none of these former attempts has produced a reliable, commercial process or charge mixture. I have, however, succeeded in producing a charge mixture which greatly increases the rapidity of conversion and results in greater uniformity and control of the resultant products. It was not thought by those who formerly attempted to produce these reactions that carbonaceous materials could be mixed into the briquets, as it was and is apparent that there must be produced an oxidizing atmosphere to bring the reactions about, so that decomposed water and air may oxidize the alkali metal of the chlorid. Therefore, mixing carbon with their material appeared contrary to good practice. A realization that such carbon would burn away from the surface of the lumps and permit an oxidizing atmosphere around such lumps led to the present invention.

To form my improved charge mixture, I mix together compositions containing silica and alumina, which may be associated with more or less soda or potash chemically combined. Examples of such materials are clay, silicious bauxite, shale, slate, carboniferous shale and the feldspars. Along with these silica and alumina compositions I mix salt, by which I mean sodium or potassium chlorid, or alkali metal chlorid. The solid materials forming the charge are preferably mixed together in well ground condition. In addition to the above materials I have in the mix carboniferous materials, either naturally or artificially placed in the mass. Examples of such carboniferous materials are anthracite coal, coke, charcoal, carboniferous shale, bituminous coal, and also saw dust. It is an essential for the proper working of my process and for the purity of the hydrochloric acid product that all the materials should be as free as possible from iron, as otherwise there is formed a volatile chlorid of iron that passes off with the hydrochloric acid fumes and forms a valueless product difficult when present in considerable quantity to separate from the hydrochloric acid. Hence care should be exercised to choose, so far as possible, non-ferruginous compounds. For example, there are two kinds of bauxite, silicious and ferruginous, and it is the silicious that is to be chosen. In nature bauxite generally contains variable amounts of ferric oxid and silica, both the ferric oxid and the silica seeming to act as acids, while the alumina acts as a base. In good commercial bauxite about 15% of the weight is iron oxid or silica, or the two oxids mixed. If bauxite is chosen, care should be exercised to see that this source of alumina and silica is as free as possible from compounds of iron, in order to obtain the proper purity of the resultant products.

As to the quality of the mixture, I should prefer that the mass contain 30 to 65 per cent. of non-ferruginous clay inclusive of chemically combined water, and from 30 to 50 per cent. of alkali chlorid. With such a mixture the lumps or briquets retain their original form after heating and after the reaction is complete. The amount of carbon in the charge may vary as the furnace operation is large or small, but from 3% to 10% is ordinarily sufficient. The amount of carbon must in all cases be kept so low that the charge mixture cannot burn as a fuel. I prefer to dry the lumps or briquets before putting them in the furnace. The temperature of treatment employed may vary from 1700 degrees to 2400 degrees Fahrenheit, according to the ratio of alumina to silica contained in the charge. The higher the percentage of alumina, the higher the temperature, and vice versa.

The material to be treated may be either in a wet, dry or plastic condition when subjected to the heat and gases of the furnace. It may be in the shape of a sheet, or shreds, or in the form of briquets, which are fed into a down draft furnace, or the charge may be loaded on cars and fed through a tunnel furnace. I prefer to put the materials in the form of briquets and to dry them before subjecting them to the action of the furnace. But I, naturally, do not limit myself to this method of shaping the material. The composition, and not the shape or condition of the material forming the charge is the essential of the present invention.

The real and chief purpose of embodying the carbon in the charge mixture is to have it burn out and leave the mass porous, so that when subjected to the conversion process the steam, air and gas may have easy access to the interior of the lumps as well as to the outer surface. There is, however, an added advantage in combining the carbon with the clay and alkali chlorid.

Notwithstanding the presence of carbon in the briquets or masses forming the charge, as carbon becomes partially burned from the briquets, I am enabled to obtain an oxidizing atmosphere surrounding the briquets and even penetrating them through the pores, (so far as the pores have formed), that were previously occupied by the then unburned carbon, and this oxidizing atmosphere continues until and after all the carbon is dispelled from the briquets. According to the size of the briquets this may take several hours more or less. Without the pores left by the carbon it takes many times longer for the transformation to take place, and the previous unsuccessful attempts have proved it to be an impracticable commercial proposition. Notwithstanding the insertion of carbon, I am enabled, on account of the oxidizing atmosphere surrounding the charge masses, to prevent the alkali metals of the same from forming as metals and volatilizing. Under these conditions, if the atmosphere were reducing, they would be carried along with the gases and discharged from the furnace as metal, or as alkali chlorid. These statements are not self apparent, but trials extending over a series of years have demonstrated their truth. The alkali oxid thus retained as such in contact with the silica and alumina present unites therewith and forms alkali-silico-aluminate. A saving of fuel is also attained by this oxidizing atmosphere. Moreover, the carbon decomposes a portion of the steam or water vapor, and the hydrochloric acid fumes resulting from the action of the hydrogen upon the alkali chlorid, added to the hydrochloric acid formed by the undecomposed steam acting on the alkali chlorid, will cause the hydrochloric acid to pass off in a more concentrated condition and to be more easily and less expensively collected in the acid towers or other receptacles to which the hydrochloric acid, vapor of water and volatile iron, chlorid of iron, are conducted.

I prefer to mix the carbon with the alumina-silica minerals in the body of the mass that makes up the charge, for the resultant product can be then produced white and free from all impurities, whereas, if separate fragments of coal, etc., are contained in the charge, iron oxid accumulates from the impurities in the aluminous minerals employed.

When the carbon is intimately mixed with the charge material, the hot carbon effects the decomposition of the iron oxid, or salts of iron, permitting the formation of chlorid of iron from the impurities that almost always occur in the aluminous or silico-aluminous components. This iron chlorid passes off with the steam and hydrochloric acid, and on account of its higher condensing temperature, it is very largely condensed in the first and hottest condensers of a series, together with some acid. This product is of low value, and the more iron in the charge, the more iron chlorid forms, lessening the amount of pure hydrochloric acid that can be secured from the chlorin of the salt employed. Hence it is desirable to keep down the amount of iron impurities in the charge mixture. This is a great disadvantage, as my alkali-silico-aluminate is to be used in producing material that must be uncontaminated by even traces of iron to secure the highest results. In other words, I desire to avoid as far as possible the use of iron compositions, inasmuch as its presence deteriorates both my hydrochloric acid and the alkali-silico-aluminate.

Having thus fully described my invention and the manner in which it is to be obtained, what I claim, is:—

1. A non-combustible charge mixture for producing hydrochloric acid and alkali-silico-aluminate, consisting of alumina, silica, alkali chlorid and carbon.

2. A charge mixture for producing hydrochloric acid and alkali-silico-aluminate, consisting of non-ferruginous clay, carbon and alkali-chlorid.

3. A charge mixture for producing hydrochloric acid and alkali-silico-aluminate, consisting of alumino-silicious compositions, said compositions being substantially non-ferruginous, in combination with an alkali-chlorid and carbon.

4. A charge mixture for producing hydrochloric acid and alkali-silico-aluminate, consisting of alumina, silica and alkali chlorid and 3% to 10% of carbon.

5. A charge mixture for producing hydrochloric acid and sodic-silico-aluminate, consisting of alumina, silica, salt, together with carbon in so small percentage as to render the charge incapable of use as a fuel.

6. A charge mixture for producing hydrochloric acid and alkali-silico-aluminate, consisting of alumina, silica, an alkali chlorid and three to ten per cent. of carbon.

7. A charge mixture for producing hydrochloric acid and alkali-silico-aluminate, consisting of lumps containing an alkali chlorid, carbon below the percentage making the lumps combustible, silica and alumina, the proportion of alumina to the silica being such that the compound formed is practically infusible at temperatues ranging from 1700 to 2400 degrees Fahrenheit, so that the resultant product after heating and reaction retains its original shape, substantially as set forth.

In witness whereof, I have hereunto signed my name in the presence of two subscribing witnesses.

ALFRED H. COWLES.

Witnesses:
 ALBERT STETSON,
 GEORGE W. CRAWFORD.